United States Patent [19]

Kishi

[11] Patent Number: 5,182,651
[45] Date of Patent: Jan. 26, 1993

[54] METHOD OF CONTROLLING THE RECEPTION OF DATA

[75] Inventor: Hiroshi Kishi, Amagasaki, Japan

[73] Assignee: Mita Industries Co., Ltd., Osaka, Japan

[21] Appl. No.: 905,086

[22] Filed: Jun. 24, 1992

Related U.S. Application Data

[63] Continuation of Ser. No. 593,286, Oct. 3, 1990, abandoned, which is a continuation of Ser. No. 79,238, Jul. 29, 1987, abandoned.

[51] Int. Cl.$^5$ ............................................. H04N 1/21
[52] U.S. Cl. ..................................... 358/296; 358/298; 346/160; 395/425
[58] Field of Search .............. 346/160; 358/296, 298, 358/300; 364/518, 519, 525

[56] References Cited

U.S. PATENT DOCUMENTS

| | | | |
|---|---|---|---|
| 4,268,159 | 5/1987 | Tashiro | 346/160 |
| 4,571,069 | 2/1986 | Kimura et al. | 355/14 R |
| 4,597,018 | 6/1986 | Sonobe et al. | 358/300 |

Primary Examiner—Lincoln Donovan
Attorney, Agent, or Firm—Bryan Cave

[57] ABSTRACT

A method of controlling the reception of data comprising a step for storing 1-page units of data which may be one or more times read out, in a receive buffer capable of storing a plurality of the 1-page units; a step for establishing a page pointer for indicating a starting address of the 1-page unit, when it is read out from the receive buffer; a step for erasing the page pointer of the 1-page units which are not required to be read out for a second time; and a step for rereading out the 1-page unit whose starting address is indicated by the page pointer, when rereading-out is required, wherein the page pointers are erased in order of the 1-page units having been established thereof.

6 Claims, 5 Drawing Sheets

METHOD OF CONTROLLING THE RECEPTION OF DATA

This is a continuation, of U.S. application Ser. No. 07/593,286, filed Oct. 3, 1990, now abandoned, which is a continuation of U.S. application Ser. No. 079,238, filed Jul. 29, 1987, now abandoned.

BACKGROUND OF THE INVENTION

This invention relates to a method of controlling reception of data which is stored, e.g., in a receive buffer of a page printer and on occasion reread.

In conventional printers which receive and print out the data sent in, a receive buffer is provided to receive a large amount of the data at one time, because the printing speed is slow. The data stored in the receive buffer is read out at a speed commensurate with the printing speed. Accordingly, a method of controlling the reception of data has been adopted wherein a write pointer which shows the address at which the data is written into the receive buffer, and a read pointer which shows the address from which the data is read out, are established.

As with dot impact printers which are not required to conduct processing after printing, the operation is completed after merely one readout of the data for printing. However, with page printers such as laser printers, liquid crystal printers, or LED printers, there is the necessity, subsequent to printing, for after-processing such as fixing. Also there are occasions upon which, owing to a paper jam at this stage, the printed page is rendered unusable in which case the same contents must be printed once again. However, in the method of controlling the reception of data which utilizes the aforementioned write pointer and read pointer, the data which has been once read out by the read pointer is erased as the processing has been completed, thereupon liberating the area of data as a write area. Thus it is difficult to print the same data a second time.

A recording apparatus which is capable of printing the same contents a second time, described in U.S. Pat. No. 4,571,069. However, this recording apparatus needs a plurality of receive buffers, and the changeover between the writing-in and reading-out of data is accomplished by means of a switch, thereby making for inefficient utilization of the receive buffers.

The present invention solves the aforementioned problems, and provides a method of controlling the reception of data with which it is possible to read the data out a second time. The invention is furthermore capable of improving the utilization efficiency of the receive buffer that stores the received data.

SUMMARY OF THE INVENTION

The present invention provides a method of controlling the reception of data comprising a step for storing 1-page units of data, which may be one or more times read out, in a receive buffer capable of storing a plurality of 1-page units; a step for establishing a page pointer for indicating a starting address of the 1-page unit, when it is read out from the receive buffer; a for erasing the page pointer of certain 1-page units which are not required to be read out for a second time; and a step for rereading out the 1-page unit whose starting address is indicated by the page pointer, when rereading-out is required, the page pointers being erased in order of the 1-page units having been established thereof.

When performing a readout a second time with the present invention, the readout of data is performed from the receive buffer address indicated by the page pointer. However, when there are a great number of pages which are required to be read out a second time by the page pointers, there will in time no longer be any area in the receive buffer into which new data may be written, whereupon, with respect to the pages for which there is no longer a necessity for a second readout, the page pointers indicating these pages are erased, thereby liberating an area for the writing-in of new data.

Hence, with the method of controlling the reception, a page pointer is provided to indicate the starting address of a page whose data stores in the receive buffer, thereby making it possible to read the data out a second time, even after it has been read out once.

In addition, the utilization efficiency of the receive buffer is improved because, regardless of the amount of data in a 1-page unit, the receive buffer can store the data for a continuous plurality of pages. That is to say, in a case where an area for the largest possible amount of data in a 1-page unit is defined, but where the data which does not fill this data area is stored as the 1-page unit, there is available a section wherein no data is stored. With this invention however the receive buffer is used in a way which does not cause such waste.

DETAILED DESCRIPTION OF PREFERRED EMBODIMENTS

Figure 1:
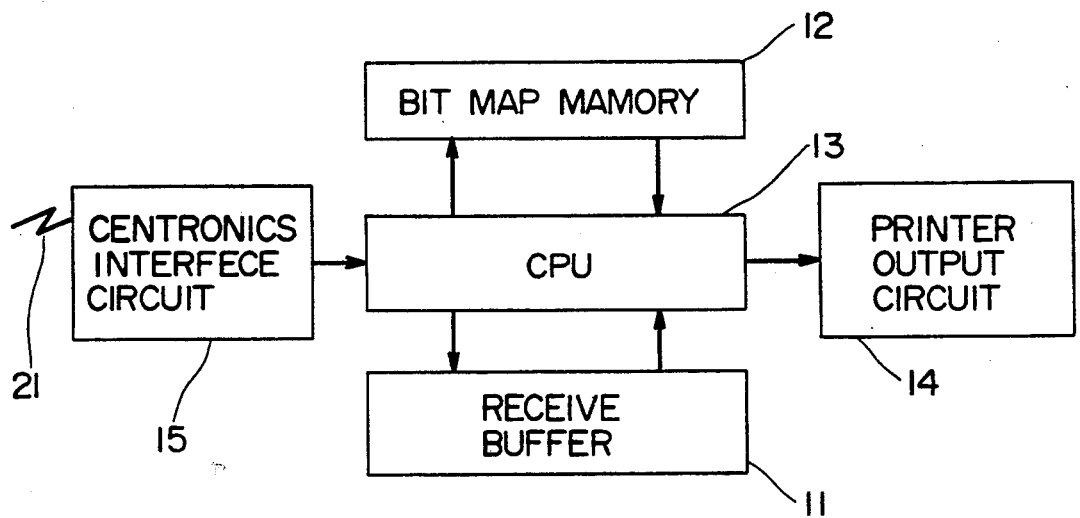
FIG. 1 is a block diagram of the electric configuration of a laser printer showing one embodiment of the present invention.

FIG. 1 is a block diagram of the electric configuration of a laser printer showing one embodiment of the present invention.

An output 21, which is sent in the form of, for example, character code information from a host computer not shown herein, is conducted to a CPU 13 by way of a an interface circuit 15, commercially available under the designation "Centronics." A receive buffer 11 possesses a capacity of 32K bytes, thereby being capable of storing, for example, the data for 15 pages which contain an average amount of data for a page, and is connected in such a way as to render possible the bidirectional communication of data with the CPU 13. Also, the character code information read out from the receive buffer 11 is converted to a dot pattern by a device not shown herein. A bit map memory 12, which temporarily stores a 1-page unit of the converted dot information, is provided, and as with the receive buffer 11 it is connected bidirectionally to the CPU 13. The output from the CPU 13 is conducted to a printer output circuit 14.

The operations are as described below.

The data is sent by way of the Centronics interface circuit 15, and the CPU 13 sequentially writes this data into the receive buffer 11. At the same time the data written into the receive buffer 11 is converted to the dot pattern and transferred to the bit map memory 12 until a 1-page unit of data has accumulated. When the data has accumulated it is outputted to the printer output circuit 14 and printed.

The aforementioned laser printer works in such a manner that, as the fixing and other after-processing of a page whose printing has been completed is being performed, the next page is being printed. As the after-processing of the first page, for which printing is complete, is concluded and the page is discharged, the printing of the second page is completed, whereupon it enters the after-processing while the data for the third page is being printed.

Figure 2:
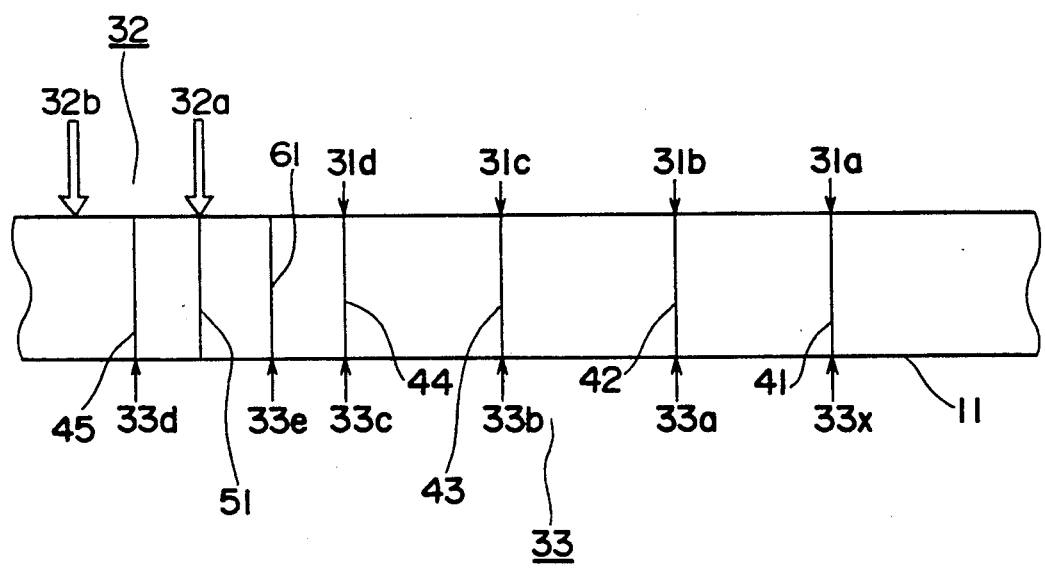
FIG. 2 is a diagram indicating the relationships between pointers and their respective data stored in the receive buffer 11, of the embodiment of the present invention.

FIG. 2 is a diagram of the relationship between pointers and the receive buffer 11, which illustrates an embodiment of the present invention.

Figure 3:
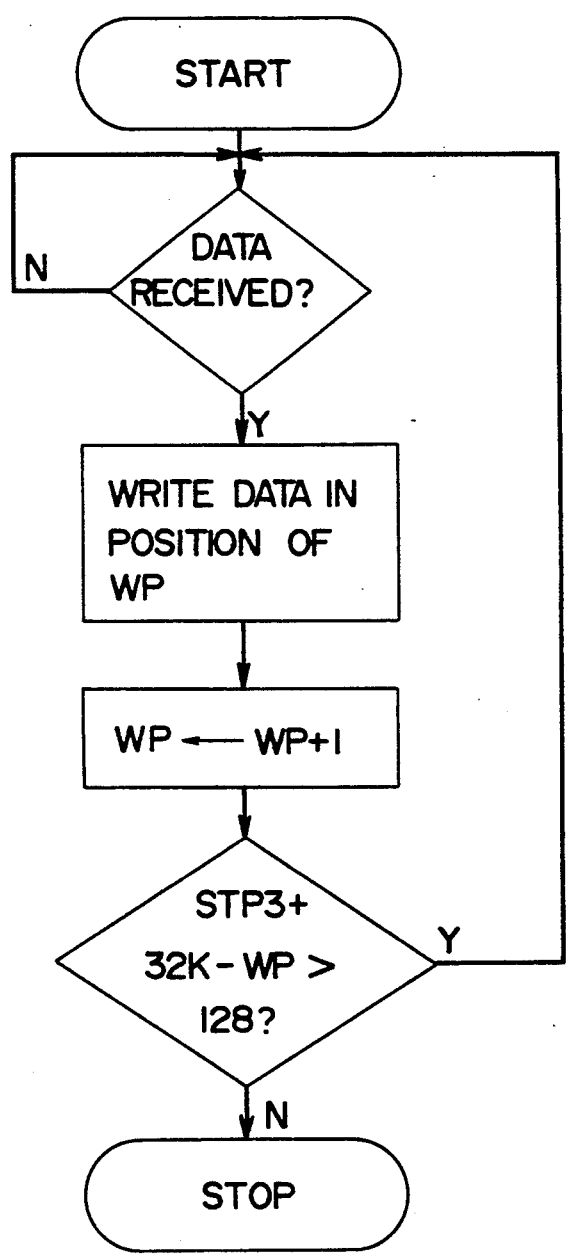
FIG. 3 is a flowchart showing the data reception from the receive buffer 11.

The data is written into the receive buffer 11 sequentially. As one proceeds across the diagram from right to left, a write pointer 32a indicates an address 51 where the data next sent will be written in. FIG. 3 is a flowchart illustrating the aforementioned write operation. Write pointers (WP) 32 are incremented each time the data is written in. The amount of write-in area remaining for the data in the receive buffer 11 is calculated by means of the formula shown below, the further writing in of new data being executed on the basis of the result thereof.

$$STP3 + 32KB - WP > 128 \quad (1\text{-}1)$$

provided that STP3 is the starting address preceding the starting address of the page presently being processed by 3 pages.

The writing in of data is executed sequentially, and this writing-in is halted at such time as the remaining write-in area becomes less than 128 bytes.

The first readout of data is then performed in order to transfer data to the bit map memory 12 and this readout location is indicated by the read pointer 33x. The data is sequentially read from an address 41 of the receive buffer 11 and transferred, and at such time as the 1-page unit of data accumulates in the bit map memory 12, a page pointer 31a is established in order to indicate the address 41. At this time the data up to an address 42 has been transferred to the bit map memory 12.

When the data in the bit map memory 12 has been transferred to the printer output circuit 14 and the bit map memory 12 has emptied, the transferring of the data from an address 42, which is indicated by a read pointer 33a, to the bit map memory 12 is performed. Upon completion of the transferring of the 1-page unit, a read pointer 33b indicates an address 43, and a page pointer 31b indicating an address 42 is established. A page pointer 31c is established in a likewise manner.

Figure 4:
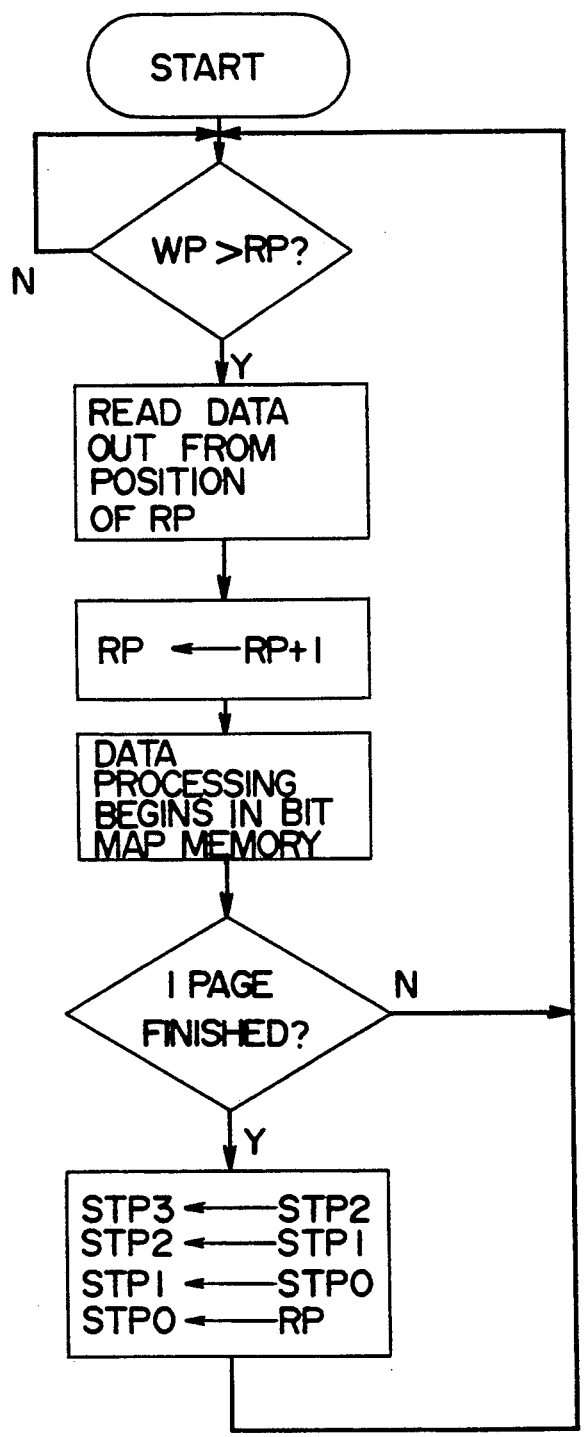
FIG. 4 is a flowchart showing the data readout operation from the receive buffer 11.

The aforementioned data readout operation is illustrated in FIG. 4. In this diagram, RP is the read pointer indicating the address at which data is read out from the receive buffer 11, STP0 is the address of the starting location of the page whose data is presently being processed, STP1 is the address of the starting location preceding STP0 by 1 page, STP2 is the address of the starting location preceding STP0 by 2 pages, and STP3 is the address of the starting location preceding STP0 by 3 pages. In the flowcharts following, symbols all have the same meanings.

When at such time as no paper jams occur and the printed pages are normally processed, new data is written into the receive buffer 11 by a write pointer 32b, and the data from an address 44 to an address 45 is transferred to the bit map memory 12 by a read pointer 33c. A page pointer 31d is established, whereupon, owing to the fact that there is no longer occasion to reread the data printed 4 pages ago, the area from the address 41 to the address 42, wherein the data is stored, is then liberated, and the page pointer 31a is consequently erased. After this, the write pointers 32 and read pointers 33 proceed in due order to the left, and the page pointer 31d is newly established, whereupon the page pointers 31b and 31c are erased in the order in which they were established.

As distinguished from the operation described above, let us now assume that, as the CPU 13 is transferring the data of an address 61 indicated by a read pointer 33e to the bit map memory 12, the page whereupon the data from the address 41 to the address 42 has been printed becomes unusable owing to a paper jam, etc. At such a time, first of all, preparations are made for reprinting, such as extricating the jammed page. After this the read pointer 33e is shifted to the address 41, which is indicated by the page pointer 31a, the data is reread out from the address 41, the data is transferred to the bit map memory 12, and then printed. Following this the transferring and printing of the data beginning at the address 42 is performed, the operation then proceeding on to the next page.

Figure 5:
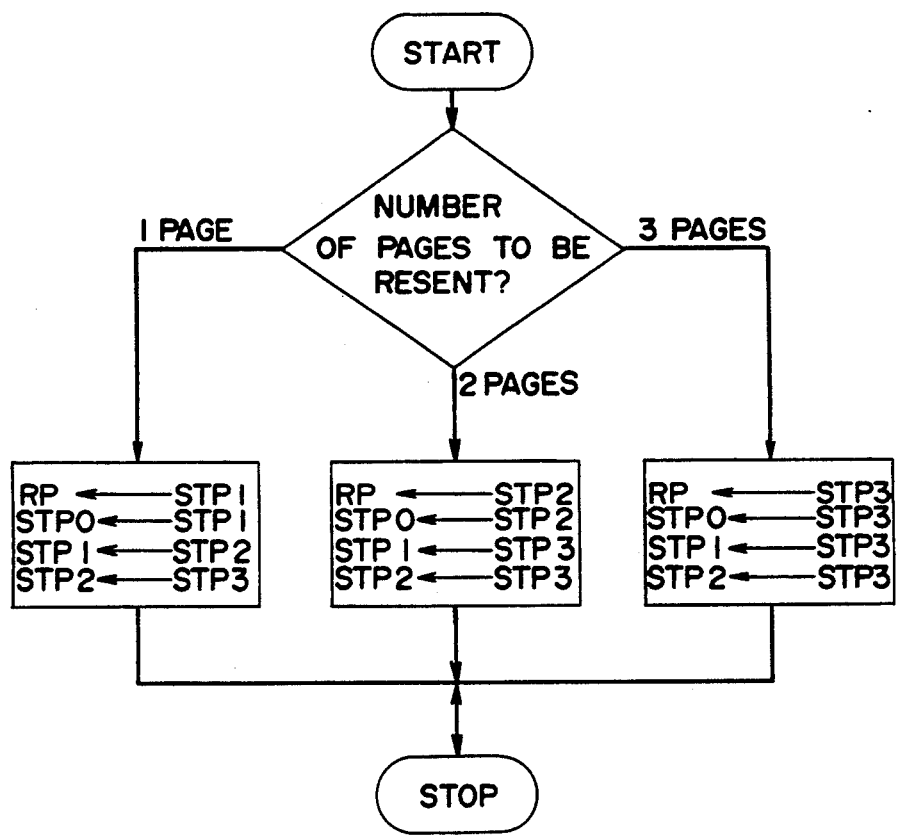
FIG. 5 is a flowchart showing the data reread-out operation from the receive buffer 11.

The data reread operation described above is illustrated in the flowchart of FIG. 5.

Figure 6:
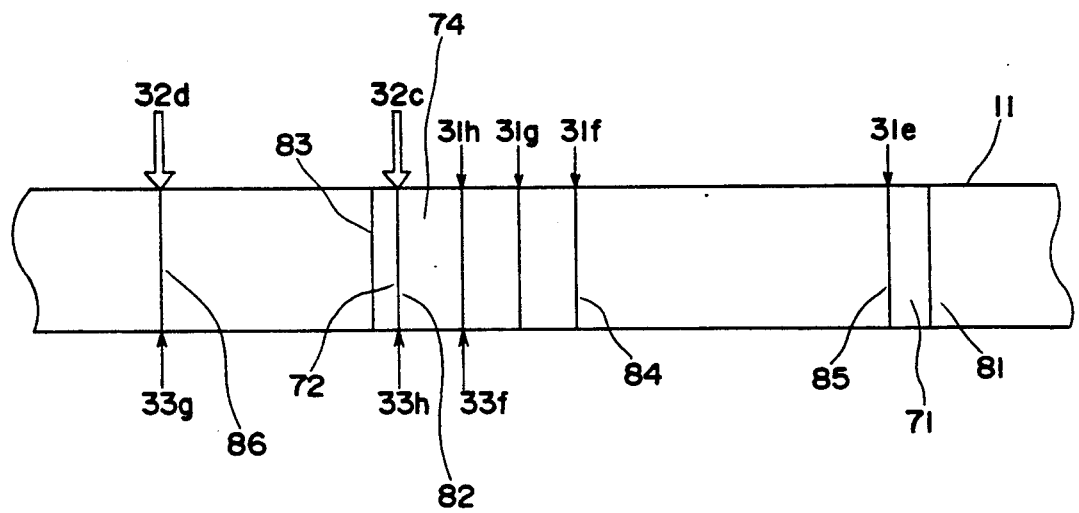
FIG. 6 is a diagram showing the relationship between the physical size of the receive buffer 11 and the logical addresses.

FIG. 6 is a diagram showing the relationship between the physical size of the receive buffer 11 and the logical addresses.

The receive buffer 11 has been created as an area logically arranged, that is to say, as addresses for the purpose of accessing the receive buffer 11, a size beginning at zero and continuing on indefinitely and without limit (in actuality the scope within which it can be utilized). However, in actuality, it physically possesses a memory area consisting of 32K bytes. In the diagram this area is allocated to the span from an address 81 to an address 83. With respect to the addresses above the address 83, the memory area which begins from the address 81 is reallocated. The reason for this is that writing data into the addresses above the address 83 also means the destruction of the data in the receive buffer 11 beginning from the address 81.

Although a size of 32K bytes is a size capable of storing the data for approximately 15 pages, this data contains not only the data for printing, but also control data indicating changes in printing position. That is to say, the 1-page unit of data indicated by page pointers 31e and 31f contains a considerable amount of control data, thereby occupying a size capable of accommodating over 10 pages of normal data with a mere 1 page of data for printing. Hence the greater portion of the memory area is occupied by the 3 pages of data from the page pointer 31e to the page pointer 31h, and by the data up to the address 82, indicated by the write pointer 32c, presently being written in. Consequently, as a range wherein it is possible to write without destroying the data beginning from the page pointer 31e, only an area 72 and an area 71 remain. The sum of the sizes of the area 71 and the area 72 is, for example, a mere 128 bytes, wherefore the writing-in of more than 128 bytes of data will result in the destruction of the data beginning from an address 85 indicated by the page pointer 31e, which may have occasion to be read out a second time. Hence the reception of the data has been interrupted, the write pointer 32c is halted at the address 82, and the data received does not fill the 1-page unit.

Meanwhile, the data up to the address 82 is being read out in accordance with a read pointer 33f, and transferred to the bit map memory 12, but the transferred data is not sufficient for the 1-page unit. On the other hand, with respect to the data for which printing has been completed, the configuration requires the preservation of the data for 3-page units, so that when the 1-page unit of data does not accumulate in the bit map memory 12, the page pointer 31e remains unerased. Since the write pointer 32c can not advance, the receive buffer 11 cannot receive the data to be transferred to the bit map memory 12, and a read pointer 33h cannot advance as there is no data to be transferred. For this reason a halt condition occurs wherein neither reception by the receive buffer 11, nor a readout from the receive buffer 11 is possible.

In order to render it possible to avoid this halt condition, to carry on the reception of new data, and to transfer the 1-page unit of data to the bit map memory 12, the page pointer 31e is erased and the write pointer 32c is enabled to advance. By means of this operation, an area consisting of the area 72, to which has been added an area the size of that from the address 81 to the address 84, is liberated to the write pointer 32c, whereupon data is written into receive buffer 11. The data up to an address 86 is then transferred to the bit map memory 12 in accordance with a read printer 33g. It should be noted that in FIG. 6 the address 86 is shown to the left of the address 82, but the address 86 is in reality located from the address 81 to the address 84.

When at this time 1 page of data has still not accumulated in the bit map memory 12, a page pointer 31f is erased. Should there be further necessity thereof, a page pointer 31g is erased. At such a time as the data transferred to the bit map memory 12 contains a considerable amount of control data, and a 1-page unit of data has not accumulated in the bit map memory 12 despite the erasure of the page pointer 31g, a page pointer 31h is erased, and until a 1-page unit of data accumulates in the bit map memory 12, an area 74 is diminished by, for example, 128 bytes at a time, with those 128 bytes being liberated for the write pointers 32.

Figure 7:
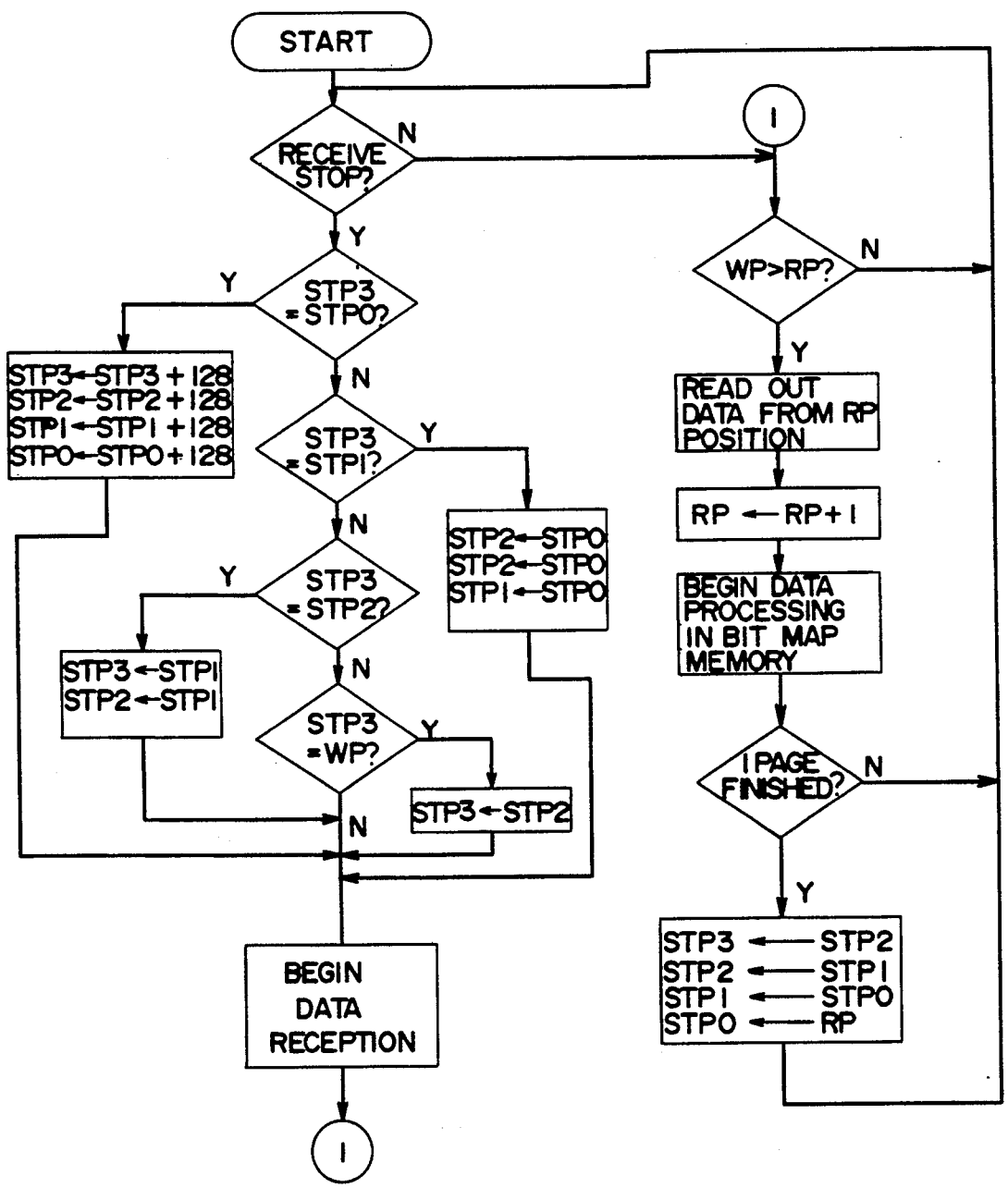
FIG. 7 is a flowchart showing the operation for avoiding a halt condition in case a halt condition has arisen wherein neither the reception of data nor the reading-out of data can be performed.

The above operation is illustrated in the flowchart of FIG. 7.

Furthermore, the present invention is not restricted to the aforementioned embodiment, inasmuch as it is possible to apply it, by means of modifying the erasable page pointers, to situations wherein there are 4 or more pages, or 2 or less pages, of data to be read out a second time.

What is claimed is:

1. A method for controlling the reception of data comprising the steps of;
   storing data in a plurality of 1-page units in a receiver buffer capable of storing said plurality of 1-page units, said stored 1-page units of data being capable of being read out from said receive buffer one or more times;
   reading out said stored 1-page units of data from said receive buffer sequentially;
   establishing a page pointer for each of said stored 1-page units of data for indicating an associated starting address for said stored 1-page unit when it is read out from said receive buffer;
   rereading out said 1-page units whose associate starting addresses are indicated by the page pointers when rereading-out of said associated 1-page units for a second time is required to effectuate printing of the same data as initially read out by said reading out of said 1-page units;
   erasing the first established one of said page pointers for said stored 1-page units whenever a predetermined number of said stored 1-page units having said page pointers are stored together in said receive buffer; and
   writing new data in a data area storing the 1-page unit of data whose page pointer has been erased.

2. The method of controlling the reception of data according to claim 1 comprising the additional step of transferring to a bit map memory the 1-page unit having been stored and being read out from the receive buffer after the step of storing the 1-page units of data therein.

3. The method of controlling the reception of data according to claim 1, wherein the step of erasing said page pointer comprises the step of erasing said page pointer in said order that said 1-page units had previously been established when there is no longer any area in said receive buffer to store said 1-page unit.

4. The method of controlling the reception of data according to claim 1, wherein the step of rereading out the 1-page unit is executed in the event that the 1-page unit was read out from the receive buffer once, but was not effectively processed.

5. The method of claim 1, further comprising the steps of printing the 1-Page unit of data read out from the receive buffer on a page of medium and after-processing the printed page, the 1-page unit of data whose page pointer is erased in said erasing step corresponding to the data of the after-processed page.

6. The method of claim 5, wherein said rereading step is carried out when an inconvenience such as a jam occurs in the printing and after-processing steps.

* * * * *

UNITED STATES PATENT AND TRADEMARK OFFICE
CERTIFICATE OF CORRECTION

PATENT NO. : 5,182,651

DATED : January 26, 1993

INVENTOR(S): HIROSHI KISHI

It is certified that error appears in the above-identified patent and that said Letters Patent is hereby corrected as shown below:

On the Title page, item "[22] Filed: Jun. 24, 1992", insert the following:

Title page, item [30] Foreign Application Priority Data
July 30, 1986 [JP] Japan ... 180563/1986 --.

Signed and Sealed this

Ninth Day of November, 1993

Attest:

BRUCE LEHMAN

Attesting Officer        Commissioner of Patents and Trademarks